US010690268B2

(12) United States Patent
Raffuzzi et al.

(10) Patent No.: US 10,690,268 B2
(45) Date of Patent: Jun. 23, 2020

(54) SUPPORT AND GUIDING APPARATUS FOR FEEDER LINES FOR EXCAVATION DEVICES

(71) Applicant: SOILMEC S.p.A., Cesena (FC) (IT)

(72) Inventors: Mirco Armando Raffuzzi, Cervia (IT); Franco Visani, Forli' (IT)

(73) Assignee: SOILMEC S.P.A., Cesena (FC) (IT)

( * ) Notice: Subject to any disclaimer, the term of this patent is extended or adjusted under 35 U.S.C. 154(b) by 287 days.

(21) Appl. No.: 15/480,942

(22) Filed: Apr. 6, 2017

(65) Prior Publication Data
US 2017/0292635 A1 Oct. 12, 2017

(30) Foreign Application Priority Data

Apr. 8, 2016 (IT) .............................. 102016036535

(51) Int. Cl.
E02F 3/22 (2006.01)
F16L 3/26 (2006.01)
(Continued)

(52) U.S. Cl.
CPC ................ *F16L 3/26* (2013.01); *E02F 3/205* (2013.01); *E02F 3/22* (2013.01); *E02F 9/2275* (2013.01);
(Continued)

(58) Field of Classification Search
CPC ..... F16L 3/26; F16L 3/10; F16L 3/223; E02D 17/13; E02F 3/205; E02F 3/22;
(Continued)

(56) References Cited

U.S. PATENT DOCUMENTS 3,382,668 A 5/1968 Berkes et al.
7,845,154 B2 12/2010 Arzberger et al.
(Continued)

FOREIGN PATENT DOCUMENTS

DE 202013101604 U1 5/2013
EP 0518292 A1 12/1992

OTHER PUBLICATIONS

Italian Search Report for Corresponding Italian Application IT UA20162436 (2 pages)(dated Nov. 23, 2016).

*Primary Examiner* — Nkeisha Smith
(74) *Attorney, Agent, or Firm* — Lucas & Mercanti, LLP

(57) ABSTRACT

A support and guiding apparatus for feeder lines having a feed pipe for excavation devices is disclosed. The apparatus has a support branch and a plurality of crosspieces connected with the support branch which includes ring chain having a first and a second series of rings linked to one another in an alternate manner, defining a longitudinal axis (X); a plurality of spacer elements coupled to rings of the first series of rings so that they cannot slide. Each of the spacer elements has a seat that houses a ring of the first series of rings by orienting it in a substantially stable manner on a first lying plane, a second seat and a third seat opposite to each other that partially house the rings of the second series of rings linked to the one housed in the first seat by orienting them on a second lying plane transverse to the first lying plane, each of said spacer elements being arranged to prevent the longitudinal sliding between the rings and to allow the rotation of the rings of the second series of rings only on the second lying plane around a rotation axis perpendicular to the longitudinal axis of the chain and to the second lying plane.

12 Claims, 12 Drawing Sheets

(51) Int. Cl.
  *E02F 3/20*   (2006.01)
  *F16G 13/18*  (2006.01)
  *F16G 15/12*  (2006.01)
  *F16G 13/12*  (2006.01)
  *E02F 9/22*   (2006.01)
  *E21B 7/02*   (2006.01)
  *F16L 3/10*   (2006.01)
  *F16L 3/223*  (2006.01)
  *E02D 17/13*  (2006.01)

(52) U.S. Cl.
  CPC ............... *E21B 7/02* (2013.01); *F16G 13/12* (2013.01); *F16G 13/18* (2013.01); *F16G 15/12* (2013.01); *F16L 3/10* (2013.01); *F16L 3/223* (2013.01); *E02D 17/13* (2013.01)

(58) Field of Classification Search
  CPC .......... E02F 9/2275; E21B 7/02; F16G 13/12; F16G 13/18; F16G 15/12; F16G 15/14; F16G 13/16; F16G 13/00; F16G 13/02
  See application file for complete search history.

(56) References Cited

U.S. PATENT DOCUMENTS

| | | | | |
|---|---|---|---|---|
| 8,997,448 B2* | 4/2015 | Casadei | ................. | E02D 17/13 248/49 |
| 9,982,824 B2* | 5/2018 | Koenig | ................. | F16L 55/035 |
| 10,132,385 B2* | 11/2018 | Choisnet | ................. | B63B 21/20 |

* cited by examiner

SUPPORT AND GUIDING APPARATUS FOR FEEDER LINES FOR EXCAVATION DEVICES

CROSS-REFERENCE TO RELATED APPLICATION

This application claims the benefit of Italian Patent Application No. 102016000036535 filed Apr. 8, 2016, the contents of which are incorporated herein by reference.

FIELD OF THE INVENTION

The present invention relates to a support and guiding apparatus per feeder lines, e.g. comprising circuits of the hydraulic oil and/or of any electrical instrumentation, for an excavation device or tool, e.g. a hydromill or a hydraulic grab, to be mounted preferably on cranes, cable excavators or drilling machines, to make diaphragms in the ground.

It is well known that, in the field of ground drilling, in particular that of diaphragms, the excavation devices usually employed are moved by means of a cable lifting device.

BACKGROUND OF THE INVENTION

These excavation devices make excavations with substantially rectangular section in the ground, down to a depth of a few hundreds of meters. Subsequently, once the excavation tool is extracted, the excavations are filled with hardening material, e.g. cement, and possibly with reinforcing elements, such as metal cages, to obtain panels or diaphragms in the ground. These panels may have both structural functions as foundation elements or water-proofing functions. During the execution of the excavation, the excavation itself is maintained filled with stabilizing fluid which, thanks to the generated pressure, has the function of bolstering the walls of the already excavated segment, preventing them from collapsing. The stabilising fluids or slurries are generally mixtures containing bentonite or polymers. The excavation device, also known as excavation module is, then, immersed in the stabilizing fluid during the execution of the excavation.

If the excavation device is a hydromill, normally used to obtain diaphragms, in order to supply actuating power to said excavation device it is necessary to connect the latter to a series of feeder lines, comprising pipes and/or cables, e.g. hydraulic oil pipes, wires for electrical instrumentation and control, generally also inserted in feeder pipes provided with such construction features as to be compatible with the work site, in particular to be suitable to be immersed in the stabilizing fluid during the excavation. These feeder lines thus connect the excavation module to the base machine located at ground level, on which are installed devices for the generation of hydraulic and electric power, such as e.g. hydraulic pumps, endothermic engines, electric engines, batteries. The base machine may be, e.g., a crawler crane, a cable excavator or a drilling machine. The feeder lines, starting from the excavation tool, are generally wound around a drum pulley positioned at the top of the arm to which said tool is suspended and then drop towards the base machine on which they are collected and accumulated. The feeder lines must follow the descent and rise movement of the excavation device within the excavation, thus being immersed in the stabilizing fluid. In order for the feeder lines to be maintained in an orderly position during the movement of the excavation tool, said feeder lines are wound around a rotating drum of a winder, generally installed on the base machine, which, rotating, winds them or unwinds them according to the necessary movements required by the excavation. The feeder lines are then deposited on the drum of the winder, accumulating on multiple superposed layers or coils, so that each new outer layer is wound with a greater radius of curvature than those already wound, which are closer to the rotation axis of the drum. Because of their weight, when the line feeder tubes are wound around the drum of the winch, each coil is subjected to strong pressures generated by the weight of all the subsequent outer coils, superposed on it. This causes the innermost coil, the one wound directly on the drum, to be the one subjected to great pressures. When the depths of the excavation are significant, indicatively more than 100 m, the length and the weight of the feeder lines have considerable values, and this can create excessive loads and stresses on the lines themselves, both on the segment unwound from the drum and suspended from the arm of the base machine, and on the segment still wound on the drum of the winder.

For the segment of the feeder lines unwound from the drum, it is necessary for the lines to be guided and supported, to prevent them from becoming entangled during the rise and descent in the excavation, as well as to enable them to correctly slide on the drum of the pulley positioned at the top of the supporting arm, and to prevent an excessive pulling force, generated by their own weight, from creating excessive elongations of the tubes or cables, causing, in some cases, undesired breakages. In fact, if the tubes or cables are too elastic, the moving system may not be able to respond in a timely manner to the winding and unwinding commands, imparted by the drum of the winch, causing problems in the correct winding. It is thus necessary to relieve the feeder lines of at least a part of the effect of their own weight, connecting them to support and guiding elements, which are structured to bear the weights without causing deformations or elongations of the lines themselves. In fact, merely increasing the thickness of the feeder tubes to boost their load-bearing capacity would reduce their flexibility and this would not enable them to be wound sufficiently fast on the drum. Hence, it is necessary to bind the feeder tubes to each other, so they can be wound in an orderly manner, as well as to fasten them to appropriately structured support and guiding elements, so that in the segment of the feeder lines that is wound on the drum are said support elements to bear the loads generated by the weight of the wound layers of tubes, relieving the tubes themselves of these loads, so that they do not undergo structural damages, such as crushing. Moreover, the support and guiding elements must prevent entanglements between the feeder pipes themselves during their movement.

From European patent EP0518292, an excavation device is known, e.g. a hydromill, wherein the feeder tubes are kept distanced from each other, in parallel, by transverse bars, also called crossbars, fastened along the tubes at regular intervals: these bars are maintained at the proper distance from each other, in longitudinal direction of the tubes, by appropriate shaped spacers, creating two support branches positioned laterally to the tube.

The terminals of the crossbars and the shaped spacers are traversed by a support cable for each branch. In particular, the spacers have a hole that allows the passage of the cable, letting the spacers be axially slidable with respect to the cable. The shaped spacers are interposed between two consecutive bars, during the assembly of the feeder lines, in an adequate number to fill the entire space present between the two bars, in such a way as to maintain said bars at the desired distance. During said assembly step, the support cables are not subjected to external loads.

When the feeder lines are extended within the excavation, the entire weight of the pipes and of the space elements bears completely on the two lateral support cables. Because of the weight of the excavating module and because of the tension that is generated during the extraction of the excavating module from the fluid-filled excavation, an elongation of the support cables can occur. Because of the fact that the spacers can slide along said cables, such elongation would entail that in the segment between the tool and the transmission pulley, located in the upper region of the support arm, all spacers would tend to slide downward, leaving a segment of the cables exposed in proximity to the pulley, i.e. a segment of free cable would be created between the spacers and the cable could go and rest directly on the surface of the pulley. Since excavation depths can be in the order of hundreds of meters, even small percentages of elongation of the support cables can create segments of free cable of a considerable length between the spacers. These segments of free cable are not compatible with a correct sliding of the feeder lines on the transmission pulley, because for example during the rise of the tool the first spacers below the free cable segment would approach the pulley in a position that is not tangential to it, and this could cause entanglements, sticking and damages of the lines themselves, or even the impossibility of continuing the extraction maneuvers of the tool from the excavation itself.

In fact, because of the elongation of the support cables, the spacer elements are no longer guided and can rotate around the axis of the cable, being able also to assume anomalous positions. The rotation of the spacer elements can be caused by the vibrations always present during the excavation work, or by the mere moving of the drilling machine or of the tool. Generally, spacers have greater width with respect to their thickness and it is desired that during a correct winding of the lines, the lower faces of the spacer elements rest on the pulley or on the winder, in such a way as to maintain the lower contact pressure and the lower thickness of each wound layer. As a result of the rotation of one or more spacer elements, said elements could rest on the pulley or on the winder with one of their lateral faces instead of with the lower face. In this case, when the tubes are rewound, the spacers may become stuck on the transmission pulley, preventing the tubes themselves from rewinding. In the same way, a localised variation in thickness of the branch wound on the cable could be created, due to the fact that one or more rotated spacer elements are not positioned according to their minimum thickness, and this entails damages and problems when a subsequent layer of the feeder lines is deposited on this area. Moreover, as a result of the rotations, segments of free cable could be created between consecutive spacer elements, complicating, or even preventing, the retrieval operation of the tubes by means of the transmission pulley.

If a spacer is damaged during the moving of the feeder lines and is detached from the cable, all spacers positioned at a greater height thereof will tend to slide downwards, since they are axially slidable on the cable, leaving an empty space in the upper part of the branch segment. Moreover, to insert a new spacer in the branch to replace the broken one it will be necessary to disassemble the branch or the support device of the feeder lines, freeing an end of the cable to allow it to pass through the new spacer that will be added.

The technical feature described by the patent EP0518292 to reduce the problem at least partially is that of axially fastening the crossbars to the support cables, so that the total elongation of the cables is subdivided and distributed in partial elongations between one crossbar and the other. In this way, as a result of the elongation of the cables, the spacers that are between two successive crossbars can slide downward only up to the lower crossbar, leaving a segment of cable free below the upper crossbar. In this way, instead of having a single large segment of free cable below the pulley, there will be a multiplicity of segments of free cable, one below each crossbar. This feature, therefore, does not eliminate the elongation but distributes it, leaving segments of free cable between the spacers that can still be wider than a spacer, and hence cause anyway entanglements and sticking during the moving of the lines. Moreover, such a locking of the crossbars to the cables obligates to fasten the crossbars to the tubes allowing a certain degree of freedom, in order not to transmit the elongations to the tubes or cables as well, but this degree of freedom inevitably reduced the guiding function of the crossbars.

U.S. Pat. No. 7,845,154 discloses an apparatus able to guide and support the weight of a set of tubes for feeder lines, formed by two lateral support branches, connected by bars transverse to the tubes, which are held at the desired distance by a series of spacer elements interposed between them. Each spacer element is traversed by at least a pair of cables, and it is axially slidable with respect to said cables.

This patent aims to solve the problem of the rotation of the spacer elements when the cable is wound on the drum, or when the branch is suspended vertically along the excavation. To overcome this problem, into each branch is inserted a second cable of smaller diameter in an appropriate hollow housing in order to prevent the elements from rotating. This second cable, due to its sole anti-rotation function, is thinner and less rigid than the main cable, not bearing any suspension or support load.

In this case, an additional problem of alignment and distancing of the spacer elements emerges, due to the fact that under the great weight of the tubes and of all hanging parts, the two cables will absorb axial loads in different way in light of their different rigidity. In particular, the supporting cable will bear the load leaving the second cable, with smaller diameter, unloaded.

The maximum elongations which the two cables will undergo will nonetheless be associated only to those of the supporting cable.

In the situation of elongation of the supporting cables, the second cable, with smaller diameter, is unloaded, allowing the spacer elements to rotate around the hole corresponding to the axis of the supporting cable.

Moreover, since the spacers are axially slidable along the cables, the solution does not solve the aforementioned problem of the downward stacking of all the spacers present in the supporting branches when the cables are elongated under the effect of the load.

To reduce the problem of the elongation of the cables in the support devices of the feeder lines, a generally used solution is to pre-tension the cables during the mounting step of the devices. This requires one end of the cable to be fastened whilst the other is pulled until an elongation of the cable is obtained, and in this condition the spacers and the crossbars are installed. During this step, the bars will be locked to the cables so that, once the ends are released, said cables do not return to the initial undeformed condition but maintain a certain preloading compressing the spacers inserted between the crossbars. In this way, when an external load is applied to the support apparatus, the cables have smaller elongations. However, this solution has the disadvantage of requiring specific equipment to mount and pre-tension the support cables, therefore such an operation can only be carried out in a workshop and it is impossible on a construction site. Moreover, after a certain number of work cycles the elongations return, hence means for restoring the tensioning are provided. These means can be, for example, wedge elements to be forcibly inserted between the spacers to induce an axial load along the cable. Therefore, this system has the limitation of requiring frequent checks and maintenance to maintain its effectiveness. Moreover, if a spacer breaks and is disengaged from the cable, in the corresponding branch segment there will be a reduction of the size of the elements interposed between two crossbars, and thus such crossbars will tend to approach each other, eliminating the preloading present on the cable.

A hypothetical solution to eliminate the problem of the elongation of the cable suspension elements, would be to replace them, for example, with chains that develop in length in extended configuration along a longitudinal development direction and although they allow lateral flexions, they are extremely stiffer in the longitudinal direction and hence they have altogether negligible elongations for these applications.

Known articulated chains, e.g. the Galle or the Fleyer chains type, are made of links consisting of a plurality of platelets each of which has elongated shape in the direction of longitudinal development of the chain, and small thickness. These platelets are connected to each other through pins transverse to the direction of longitudinal development of the chain, forming the links. These links can, therefore, rotate relative to one another around the axes of the pins and allow the chain to be wound. By fastening several platelets arranged side by side in parallel on each pin, compact and very stiff chains can be obtained, with high strength capacities. In order for these chains to work correctly, the platelets must be mounted with precise couplings on the pins, because excessive clearances would lead to a rapid wear of the chain. These chains cannot be used in devices for the excavation of diaphragms because if they are immersed into the stabilizing fluids of the excavations, in contact with these fluids they tend to seize, losing the indispensable flexibility to allow winding on drums. Stabilizing fluids, which are generally bentonite-based, are highly basic and cause a rapid oxidation of the chains, and this oxidation can cause the pins of the links to lock, preventing the rotation of a link relative to the other. This oxidizing and corrosive effect is amplified if the chain is cyclically first immersed and then let dry in air.

Ring chains, also called Genoa chains, consist of a sequence of rings that intersect each other in such a way as to allow a limited movement of each ring relative to the others in the direction of longitudinal development of the chain. Each ring is mounted rotated by ninety degrees relative to the preceding one around the longitudinal axis of the chain. This type of chain has high tensile strength and is also very flexible in all directions. The absence of a constraint that obligates the rings to rotate on a given plane allows extreme freedom of relative movement between the rings and the chain can thus flex on any plane. In addition, each ring can effect relative rotations with respect to the preceding ring and to the following ring around the longitudinal axis of the chain. This latter characteristic makes it problematic to use ring chains in known support and guiding devices of the feeder lines for excavation devices. In fact, using a ring chain in support and guiding devices of the feeder lines, the spacer elements connected to the chains would tend to rotate around the axis of the chains themselves, making a correct orientation of said elements difficult. Moreover, both articulated chains and ring chains are unsuitable to be wound in an orderly manner on several layers around a drum. Since they do not have specifically provided support surfaces and guiding elements, they would tend to misalign and to tangle with respect to the lower layers. More in particular, ring chains have no flat surfaces suitable to the orderly superposition of the coils and during winding it is possible for the rings, as they progressively superposed in different layers on the drum, tend to mutually rotate around the longitudinal axis of the chain, causing misalignments of the layers with possible entanglements.

SUMMARY AND OBJECTS OF THE INVENTION

The purpose of the present invention is to overcome the aforementioned drawbacks and in particular to devise a support and guiding apparatus for feeder lines that assures easy winding on a drum of a winder.

This and other purposes according to the present invention are achieved by constructing a support and guiding apparatus for feeder lines as described in the claims.

BRIEF DESCRIPTION OF THE DRAWINGS

The characteristics and the advantages of a support and guiding apparatus for feeder lines according to the present invention will become more apparent from the following exemplifying and not limiting description, referred to the accompanying schematic drawings in which.

DETAILED DESCRIPTION OF THE INVENTION

With reference to the figures, a support and guiding apparatus 3 for feeder lines of an excavation device 2 of a drilling machine 1 is shown, preferably for the execution of diaphragms. The excavation device can be provided with any cutting and/or excavating tool, although in the figures it is shown provided with cutting tools 20 such as cutter wheels.

The drilling machine 1, also called base machine is, for example, a cable excavator or a crane, or a crawler drilling rig with vertical tower.

Figure 1:
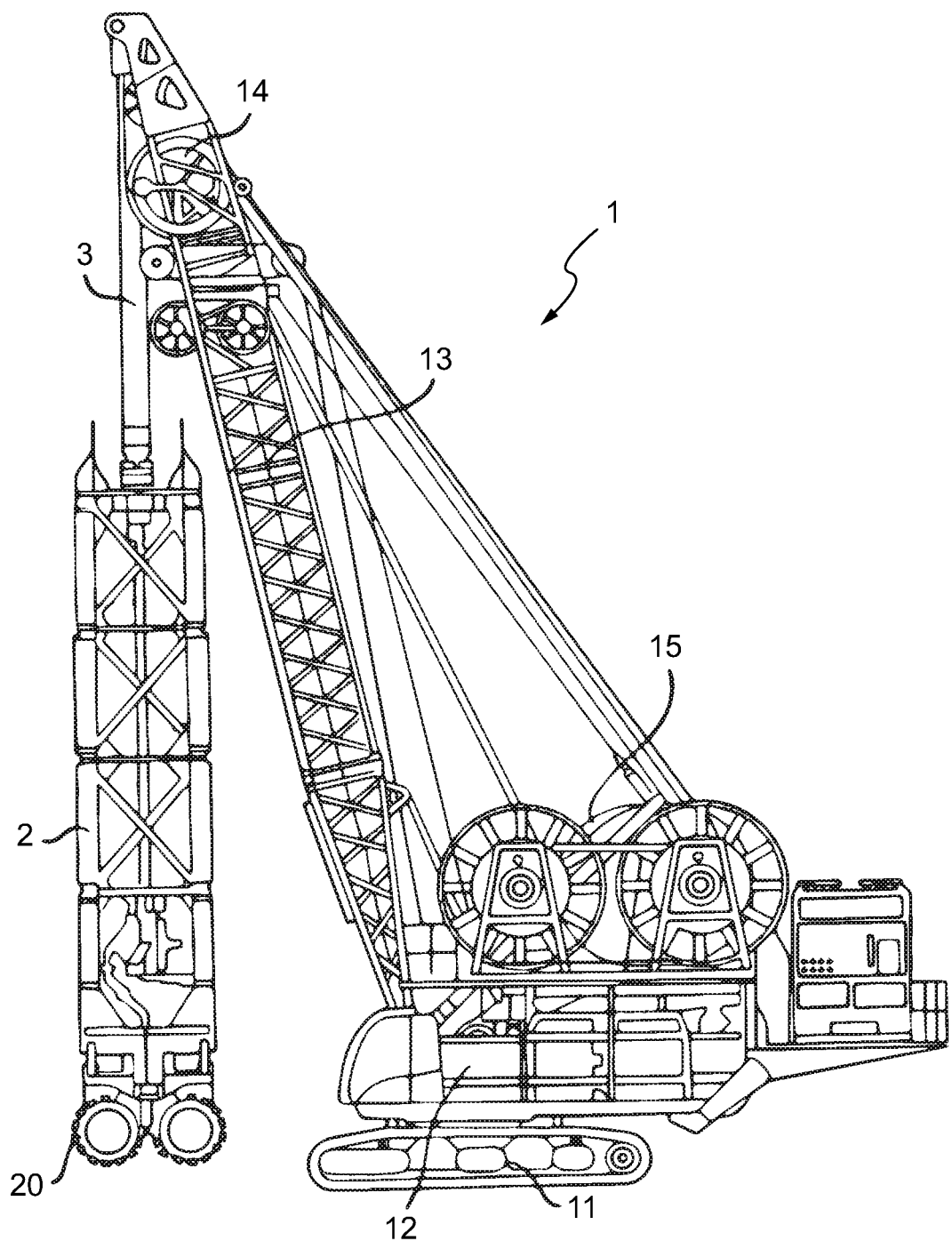
FIG. 1 is a schematic assembly view illustrating a drilling machine for diaphragms, with excavation tool provided with cutting wheels, on which is installed a feeder line, comprising the support and guiding apparatus for feeder lines, according to the present invention.

FIG. 1 shows a drilling machine 1 that comprises a crawler unit 11 surmounted by a rotary turret 12 associated with a tilting arm 13. In the rest of the present description, for the sake of simplicity reference shall be made to a drilling machine with tilting arm like the one in FIG. 1, however the invention can be applied to a drilling machine with vertical tower, or a machine in which the tilting arm 13 could have box beam structure.

As shown in FIG. 1, on the arm 13 is preferably mounted a transmission pulley for the support and guiding apparatus for feeder lines. Such pulley can also be a cylinder or drum and its length may be comparable to that of the guiding and support apparatus 3, to enable said apparatus to bear over its entire width. The feeder lines comprise feeder tubes 5 which can thus be tubes within which travel hydraulic tubes and/or electric cables for the transmission of signals and/or power, or they can be hydraulic tubes themselves.

The support and guiding apparatus 3 for feeder lines is adapted to connect the drilling machine 1 and the excavation device 2, and it is moved by a winder 15, preferably motorised to actuate its rotation, installed aboard the rotating turret 12. In an alternative embodiment, the winder 15 could not be installed directly on the drilling machine 1 but be fastened to an additional means that is positioned with respect to the machine in such a way that the feed pipes 5 and the entire support and guiding apparatus can move and wind regularly. In any case the support and guiding apparatus 3 for feeder lines is adapted to be wound around a winding axis.

Figure 2:
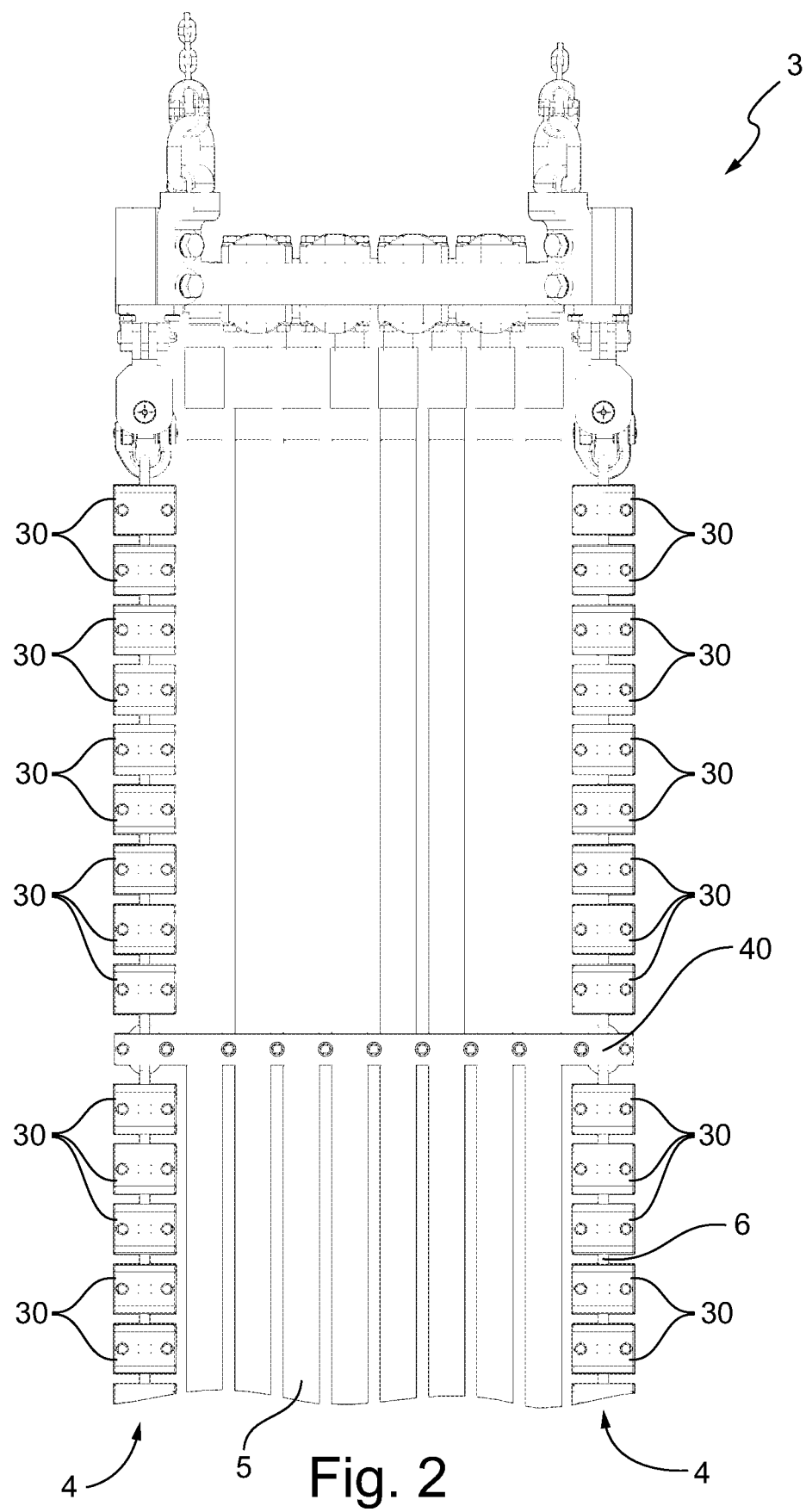
FIG. 2 is a partial frontal schematic view of the support and guiding apparatus for feeder lines.

As shown in FIG. 2, the support and guiding apparatus 3 for feeder lines comprises at least one support branch 4 and a plurality of transverse connecting elements or crosspieces 40, able to guide the feed pipes 5, connected to the at least one support branch 4.

Figure 4:
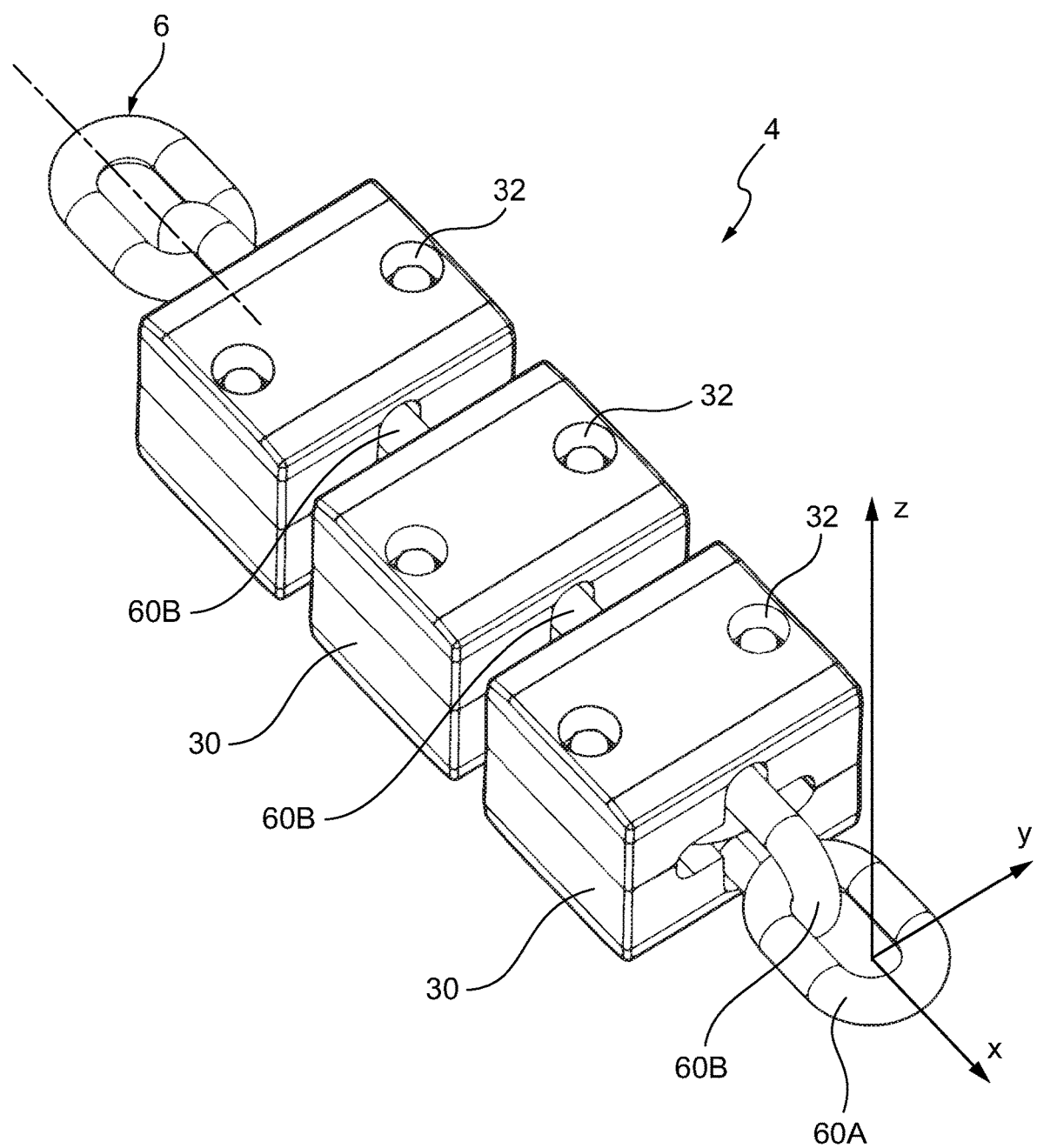
FIG. 4 is a prospective view of a portion of a support branch included in the apparatus of FIG. 2.

A segment of said support branch 4 is shown in FIG. 4 in rectilinear configuration, i.e. in the condition in which it is arranged when a load is applied in the longitudinal direction of the branch, i.e. along the X-axis according to the Cartesian tern shown in FIG. 4. The load can also be represented only by the own weight of the support branch 4. Said support branch 4 comprises at least one ring chain 6, e.g. a Genoa chain, engaged with a plurality of spacer elements 30 arranged in sequence to each other along the chain 6.

In one embodiment of the present invention the support and guiding apparatus 3 for feeder lines comprises a unique support branch 4 associated with a ring chain 6 mounted in an intermediate position, preferably central, of the feeder line namely with the feed pipes 5 which are arranged substantially parallel at both sides of the support branch 4. This embodiment with a single support branch 4 is particularly suitable for configurations intended to shallow excavations.

To carry out excavations at greater depths, two or more support branches 4 can be provided. In the embodiment shown in FIG. 2, for example, the support and guiding apparatus 3 for feeder lines has two support branches 4 mounted at the two lateral ends of the feeder line namely with the feed pipes 5 that are all positioned between the two support branches 4.

Figure 3:
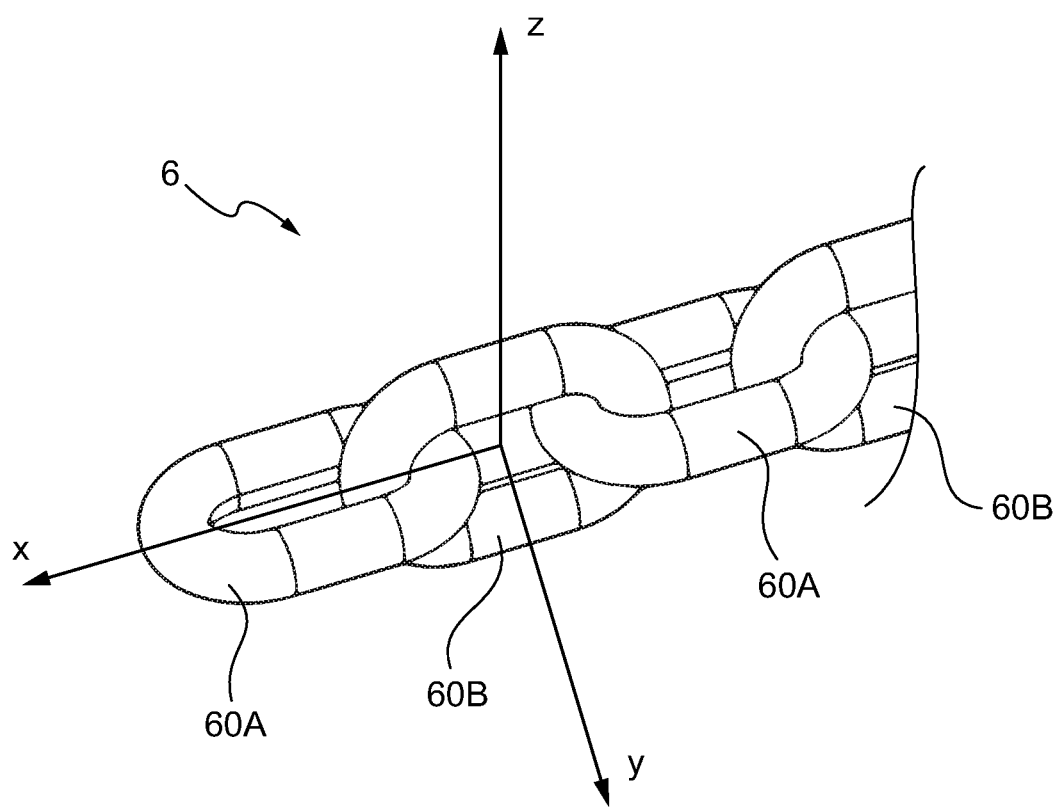
FIG. 3 is a prospective view of a segment of ring chain included in the apparatus of FIG. 2.

As visible in FIG. 3, when the ring chain is subjected to traction, tends to be arranged in rectilinear or extended configuration, defining a longitudinal axis of the chain that is indicated as axis X. The ring chain 6 used in the support branch 4 comprises a first series of rings 60A and a second series of rings 60B linked with each other in an alternating manner, i.e. so that each ring belonging to a series is interposed between two rings belonging to the other series and is linked to them at its own ends. Each ring 60A, 60B of the chain comprises two folded or curvilinear end portions that define two curvilinear segments at the ends of the ring and two rectilinear portions interposed between the two folded end portions that define two respective rectilinear segments. The curvilinear and rectilinear segments of a single ring lie on a unique plane defined as development plane. During the assembly of the chain, each ring is connected to the preceding one in rotated position relative to the longitudinal axis of the chain, so that its own plane of development is transverse, preferably substantially perpendicular, to the plane of development of the preceding ring and of the following ring. In FIG. 3 the rings are linked in such a way that the respective planes of development are perpendicular to one another; in particular, the axes X and Y identify the development plane of the rings 60A of the first series and the axes Y and Z identify the plane of development of the rings 60B or the second series. In general, the rings 60A of the first series have a first plane of development and the rings 60B of the second series have a second plane of development when they are linked to one another.

When the chain is free, the mutual coupling between the curvilinear end portions of the rings 60A and 60B allows ample relative rotations between them; in particular, the first ring 60A or the second ring 60B can rotate both around the axes Y and Z describing angles that can even exceed 180° and around the axis X. The presence of the rectilinear portions allows axial relative slides of the ring 60B compared to the ring 60A along the longitudinal axis X of the chain, and the width of such slides will be substantially equal to the length of the rectilinear segment. These characteristics endow the chain with great flexibility, enabling it to be wound on drums. At the same time, the geometry of the rings endows the chain with much greater compactness and stiffness than steel cables, i.e. the chain subjected to the maximum axial loads for which it was dimensioned undergoes substantially null elongation, or otherwise negligible elongation along the longitudinal axis X.

Figure 5A:
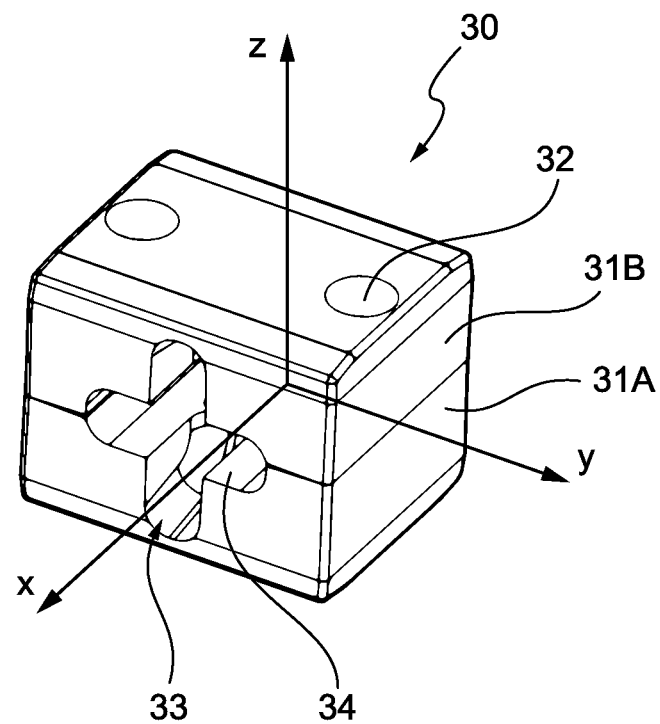
FIGS. 5A and 5B are two schematic views, respectively prospective and frontal, of an assembled spacer element included in the support branch of FIG. 4.

Preferably, each spacer element 30 which engages on the chain 6 of the support branch 4 has, when assembled, a shape that is substantially similar to a parallelepiped as shown in FIG. 5A.

For the sake of simplicity, considering a Cartesian reference system XYZ as shown by way of example in FIG. 5A, the size in the X direction is defined as the longitudinal dimension of the spacer element 30, the size in the Y direction as the transverse dimension of the spacer element 30 and the size in the Z direction as the thickness of the spacer element 30. The spacer elements 30 are applied to the ring chain 6 coupled to respective non-adjacent rings in such a way that they cannot slide with respect to them and to result aligned and separated with respect to one another, when the support and guiding apparatus for feeder lines 3 is in extended configuration i.e. when the support branches 4 are in rectilinear configuration. In particular, the spacer elements 30 can all be coupled with the rings 60A of the first series of rings, as in the embodiments shown, or all coupled with the rings 60B of the second series of rings. For the sake of simplicity, in the rest of the description reference shall be made to the case in which each spacer element 30 is coupled with a respective ring 60A of the first series of rings, the description being applicable, with an obvious reversal of the roles of the rings, to the case in which each spacer element 30 is coupled with a respective ring 60B of the second series of rings.

With reference to the first case mentioned above, therefore, each spacer element 30 has a first seat 34 adapted to house a respective ring 60A of the first series of rings by orienting it in a substantially stable manner on a first lying plane.

The first seat 34 is preferably obtained as a through cavity that extends between two opposed faces of the spacer element 30 and that defines on said faces two openings whose shape is elongated in a direction parallel to the first lying plane, as in the embodiment illustrated in the accompanying figures. Alternatively, the first seat 34 can also be obtained by means of a closed space internal to the spacer element.

Each spacer element 30 also has a second seat 33 and a third seat 39, opposite to each other, adapted to partially house the rings 60B of the second series of rings linked to the one housed in the first seat 34 by orienting them on a second lying plane transverse to the first lying plane.

Each spacer element 30 is, in addition, advantageously arranged to prevent the longitudinal sliding between the rings 60A, 60B of the first and of the second series of rings.

The second 33 and the third seat 39 face two opposed faces of the spacer element 30 defining on said faces two openings with elongated shape in a direction parallel to the second lying plane. If the first seat 34 is obtained as a through cavity, the openings defined by the first seat 34 are transverse to those defined on the same faces by the second seat 33 and by the third seat 39. If the first and the second lying plane are orthogonal to one another, then the openings defined by the first seat 34 are also orthogonal to those defined on the same faces by the second seat 33 and by the third seat 39 making a cross, as visible in FIGS. 5A and 5B.

Advantageously, moreover, the second seat 33 and the third seat 39, are arranged and/or shaped to block the sliding between the respective rings 60B of the second series of rings partially housed in said seats and the ring 60A of the first series of rings completely housed in the first seat 34.

In fact, the second seat 33 and the third seat 39 extend starting from opposed faces by a predetermined tract in a longitudinal direction towards the inside of the spacer element 30, defining a separating intermediate tract between them. The second seat 33 and the third seat 39 have a back wall with a curvilinear profile which is complementary to the curvilinear end portions of the rings that are intended to be inserted into said second seat 33 and third seat 39. The bottom wall of the second seat 33 and of the third seat 39 refers to the terminal portion in longitudinal direction of said seats that is internal to the spacer element 30.

The first seat 34 traverses the spacer element 30 longitudinally, i.e. in the X direction. The longitudinal length of the first seat 34 is substantially equal to the longitudinal dimension of the ring 60A, which the seat 34 is intended to house, and is at most equal to that of the spacer element 30. The first seat 34 has an extension in the direction Y and in the direction Z as to result flush with the ring 60A when the latter is housed in the first seat 34 itself, i.e. the seat copies the transverse dimensions of the chain ring and the thickness of the chain ring leaving sufficient clearances to allow an easy insertion of the ring itself into the cavity.

Preferably, the first seat 34 has internally an abutment protrusion 35, that extends transversely, preferably orthogonally, to the first lying plane defined by the first seat 34; said abutment protrusion 35 is advantageously shaped to limit the mobility of the ring 60A of the first series of rings relative to the spacer element 30.

Preferably, the abutment protrusion 35 develops on the separating intermediate portion between the second seat 33 and the third seat 39. Preferably, said abutment protrusion 35 partially occludes the first seat 34 along its direction of longitudinal development.

Figure 5B:
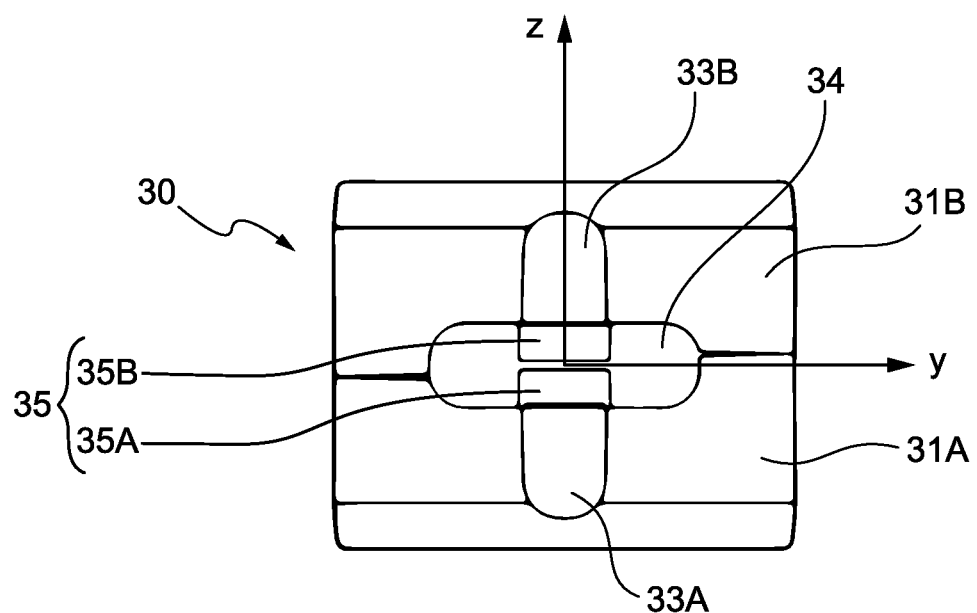

In FIG. 5B it is possible to observe that the abutment protrusion 35 leaves lateral channels for housing the portions of the ring 60A.

Said abutment protrusion 35, being substantially at the center of the spacer element and extending in the direction of the thickness, also has an additional function of stiffening the spacer and prevents the spacer from flexing in the central region, which is more flexible because of the presence of the cavity 34. Thus, when the spacer element is subjected to pressures on the upper and lower faces of the thickness, due for example to the weight of the layers of branch superposed on the winder, it does not deform in the center thanks to the support provided by the abutment protrusion 35.

In a preferred embodiment, the spacer element 30 comprises a first half-shell 31A and a second half-shell 31B adapted to, while assembled, to be placed one on the other and to be constrained to each other by means of fastening screws or bolts in through-fastening seats 32 obtained in corresponding positions on both half-shells 31A and 31B. The through-fastening seats 32 can have tracts with diameter variations along the thickness of the spacer element 30 to allow in the different tracts the housing of the shaft of the screws, of the head of the screws or of the nut. The through-fastening seats 32, moreover, are shaped in such a way that the screws and the other fastening components do not project from the thickness of the half-shells 31A and 31B once they are coupled. Moreover, the diameter of the fastening seats 32 is sufficiently large as to allow also the insertion of socket wrenches to retain in rotation or to impart tightening torques to the elements of the bolts.

Figure 6:
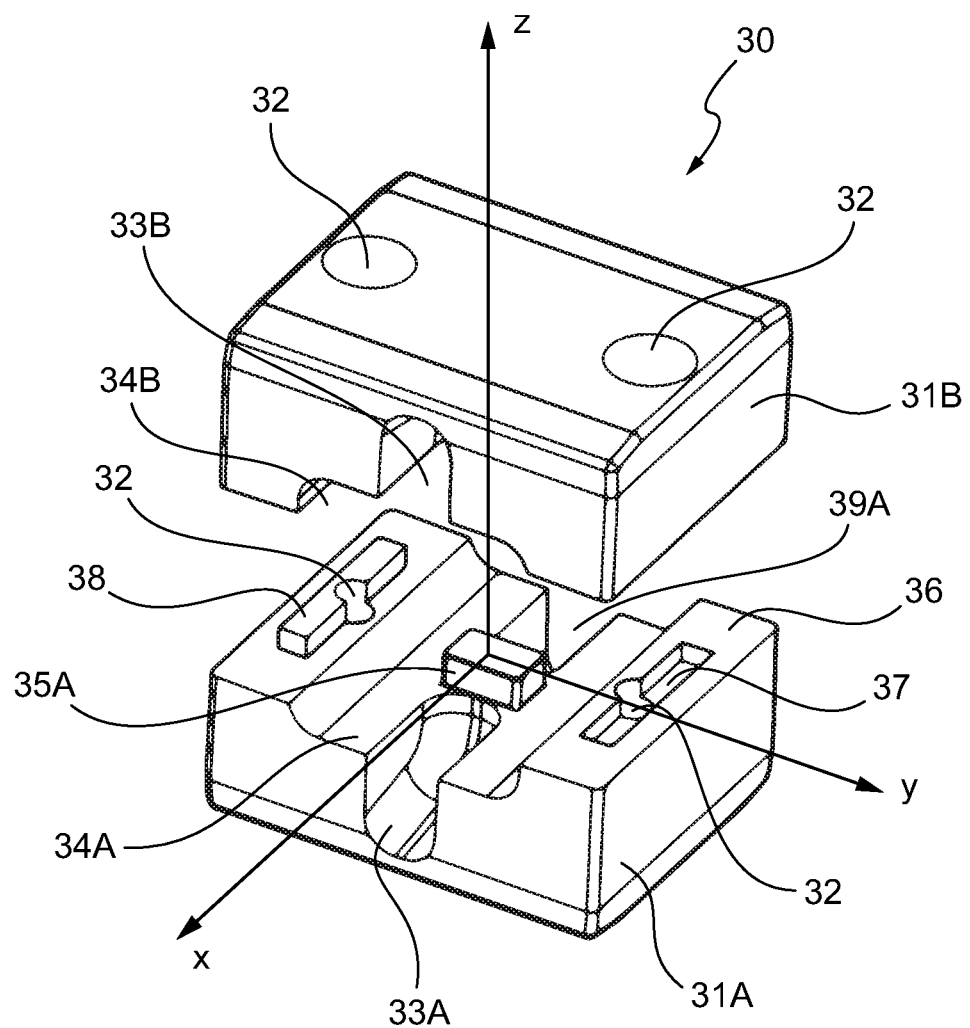
FIG. 6 is an exploded prospective schematic view of the spacer element of FIGS. 5A and 5B.
Figure 7A:
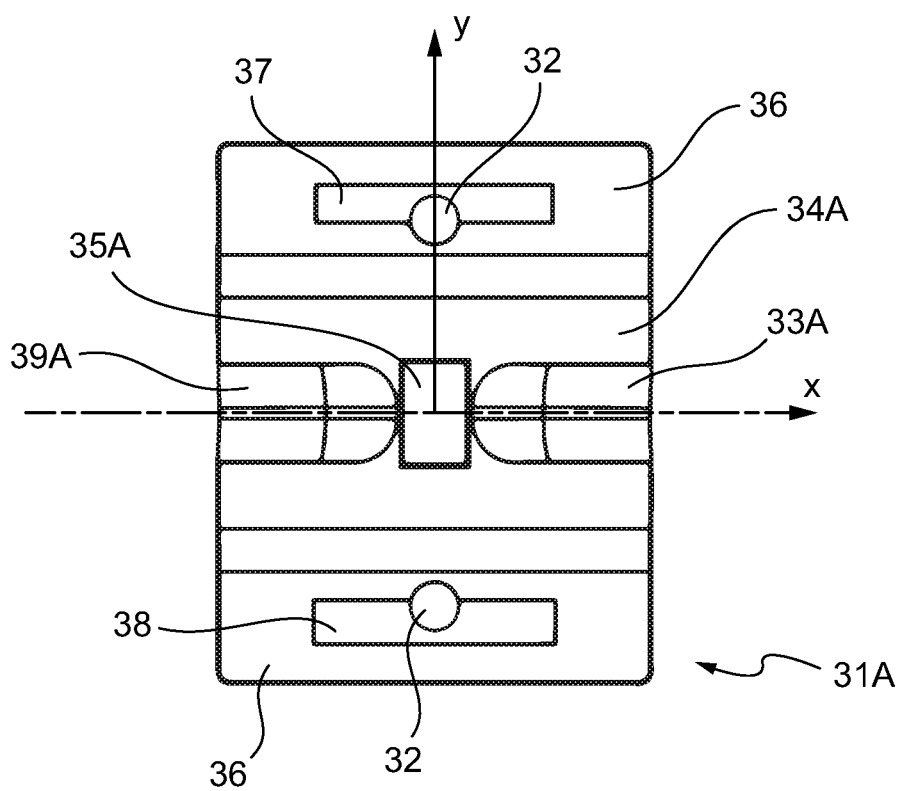
FIG. 7A is a schematic plan view on the plane XY of a half-shell of the spacer element of FIG. 6.
Figure 7B:
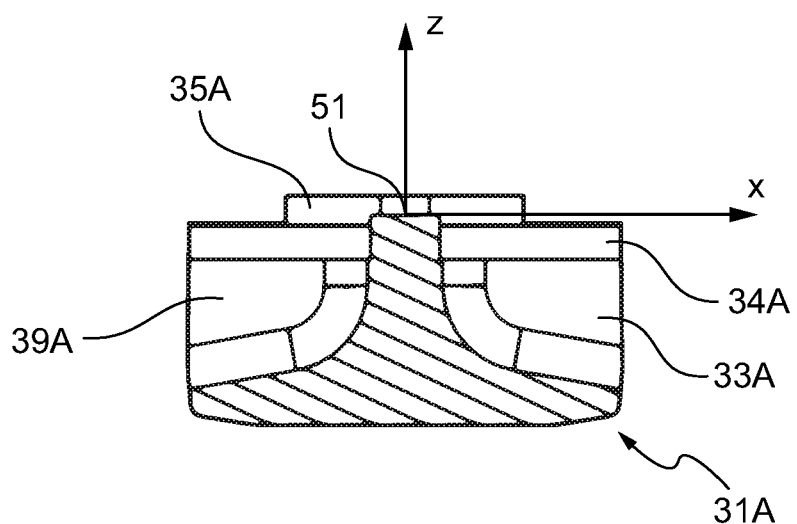
FIG. 7B is a schematic section view on the longitudinal plane XZ of the half-shell of FIG. 7A.

As visible in FIG. 6, the two half-shells 31A and 31B comprise two respective first half-seats 34*a*, 34B, second half-seats 33A, 33B and third half-seats 39A (the third half-seat of the second half-shell 31B is not shown) adapted to make respectively the first seat 34, the second seat 33 and the third seat 39 when the two half-shells 31A and 31B make the spacer element 30. Similarly, the two half-shells 31A and 31B comprise two semi-protrusions 35A, 35B adapted to make the abutment protrusion 35 when the two half-shells 31A and 31B make the spacer element 30.

The two half-shells 31A and 31B have two abutment portions 36, perpendicular to the direction Z of the thickness, which come into contact with each other when the spacer element 30 is assembled. The abutment portions 36 bear the compression load generated by the fastening screws of the half-sells and extend along the longitudinal direction laterally to the first seat 34. On said abutment portions 36 at the through-fastening seats 32 are obtained in corresponding positions of the projecting portions 38 and receiving portions 37 intended to engage with each other while assembled. Said receiving portions 37 and projecting portions 38 have the function of centering and abutting the two half-sells 31A and 31B assuring the alignment of the respective fastening seats 32 to facilitate the insertion of the bolts in the seats and preventing longitudinal slides along the X axis of the two half-shells, thus preventing the shells to work by cutting. Advantageously, the second seat 33 and the third seat 39 of each spacer element 30 is shaped to allow the rotation of the rings 60B of the second series of rings solely on the second lying plane around an axis perpendicular to the longitudinal axis of the ring chain 6 and to the second lying plane.

Preferably, the second seat 33 and the third seat 39 of each spacer element 30 have a tapered shape in the longitudinal direction starting from the interior towards the respective openings on the outer faces normal to the longitudinal axis of the spacer element 30, with the maximum width at said openings. Preferably, the second seat 33 and the third seat 39 of each spacer element 30 have substantially constant width in the transverse direction.

Advantageously, the first half-shells 34A, 34B have a resting plane for the rings 60A of the chain 6. Laterally to this resting plane, in transverse direction, the first half-shells 34A, 34B have two curvilinear edges with complementary shape to the profile of the corresponding portions of the ring intended to be housed in the first seat 34.

Preferably, the abutment protrusion 35 has a transverse dimension as to be flush with the rings 60A, namely slightly smaller than the internal distance between the two rectilinear segments of the ring 60A.

Figure 8:
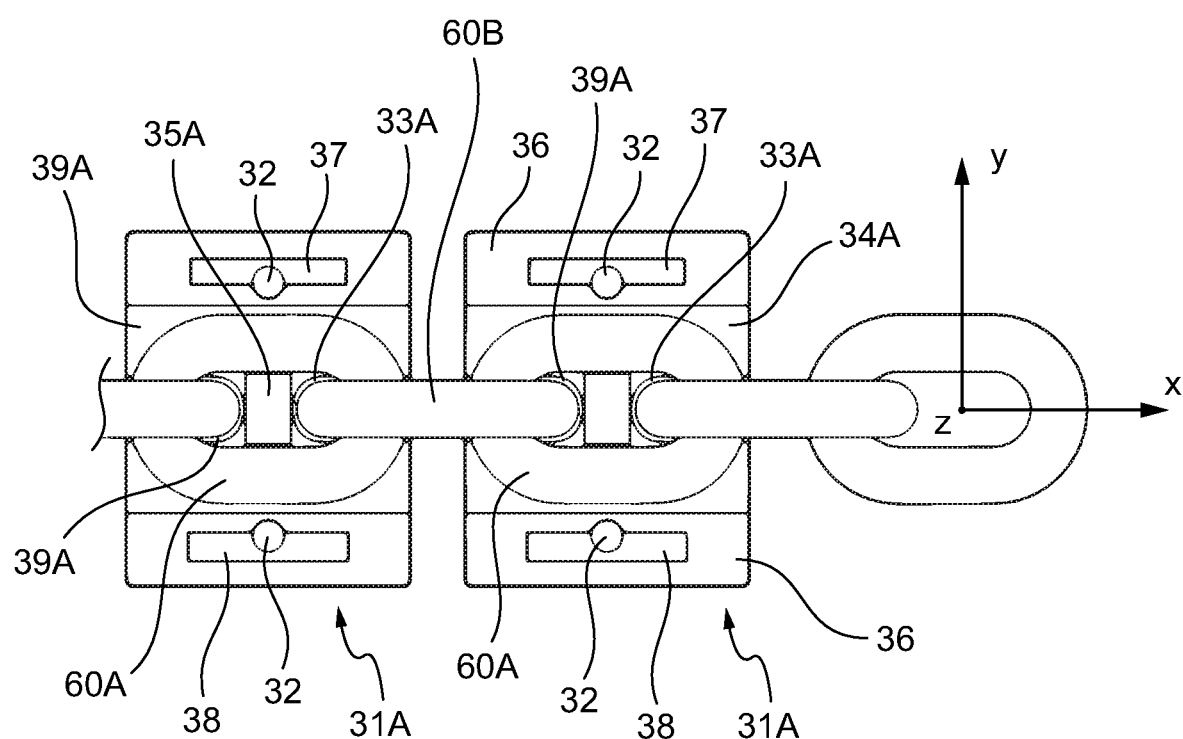
FIG. 8 is a schematic partial plan view on the plane XY of the support branch of FIG. 4, partially assembled.

FIG. 8 shows a step of assembly of the support branch 4, in which the spacer elements 30 are applied to the ring chain 6. The rings 60A of the first series of rings rest on the resting plane of the first half-seat 34A of the first half-shell 31A of each of the respective spacer elements 30; once said rings 60A rest, the rings 60B of the second series of rings are partially housed in the second half-seat 33A and in the third half-seat 39A of the first half-shell 31A of each of the respective spacer elements 30. At this point, the second half-shells 31B are fastened above the respective first half-shells 31A.

The assembly of a support branch 4 allows to obtain a branch arranged to rotate solely around a rotation axis perpendicular to the longitudinal direction of the ring chain and perpendicular to the lying plane of the rings 60B of the second series of rings, e.g. in the case illustrated in FIG. 8 an axis parallel to the axis Y. The rotation takes place describing an arch that substantially belongs to a plane of rotation that coincides with the lying plane of the rings 60B of the second series of rings, e.g. the XZ plane in the case illustrated in FIG. 8.

FIG. 8 shows how the rings 60A of the first series of rings are housed in the first half-shell 34A so that they lie on a plane XY perpendicular to the plane of rotation XZ of the support branch 4. The abutment half-protrusion 35A is coupled with the internal profile of the ring 60A of the first series of rings, preventing the transverse translations of the first half-shell 31A relative to the ring 60A, except for minimum pre-determined values due to the clearances necessary to allow an easy insertion. The rings 60B are housed at least partially in the second half-seat 33A and in the third half-seat 39A in such a way that they lie on the plane of rotation XZ of the support branch 4. The second half-seat 33A and the third half-seat 39A are separated from each other in the longitudinal direction and make the two rings 60B be maintained at the opposed ends of the inner profile of the ring 60A. In this way the half-shell 31A, and the entire spacer element 30 as well, once it is assembled, is axially fastened to the chain, i.e. the longitudinal translations of the half-shell 31A relative to the ring 60A are prevented, except for pre-determined minimum values due to the clearances necessary to allow an easy insertion of the rings into the seats. A slight relative axial sliding between spacer element 30 makes one of the two rings 60B inserted in the second seat 33 or in the third seat 39 of the spacer element 30 abuts against the bottom wall of that seat, stopping the sliding and limiting it to a value equal to the clearances present between ring and seat. When the two half-shells are fastened to each other the chain 6 traverses the spacer element 30 longitudinally. The superposition of the two half-shells blocks every relative translation between the ring 60A and the spacer element 30 in the direction of the thickness of the spacer element, i.e. along the axis Z, because in this direction the first seat 34 is substantially flush with the thickness of the ring 60A. Thus, the spacer element 30, thanks to the shape of the first seat 34 with the protrusion 35, is substantially integral with the ring 60A.

In the assembled configuration, as visible in FIG. 4, the spacer elements 30 of a branch are, preferably, equidistant from each other in the longitudinal direction of the chain, with a pitch that depends on the pitch of the links of the chain. In the under load condition, the support branch 4 assumes a rectilinear or extended configuration with the spacer elements 3 that are not in contact with one another but are distanced from each other by an interspace where the ring 60B extends. This interspace allows excellent flexibility of the support branch 4, allowing rotations of the spacer elements 30 and of the entire branch 4 around an rotation axis parallel to the axis Y of FIG. 4.

Preferably, each ring 60B, which lies on the plane of rotation XZ of the support branch 4, is inserted into a second seat 33 of a first spacer element 30 for a longitudinal tract that is substantially equal to or greater than the longitudinal dimension of the curvilinear end portion of the ring and it is simultaneously inserted into the third seat 39 of a second spacer element 30 for a longitudinal tract that is substantially equal to or greater than the longitudinal dimension of the curvilinear end portion of the ring. Since the second seat 33 and the third seat 39 have such transverse width in the Y direction as to result being substantially flush with the ring 60B namely only slightly greater than the thickness of the ring 60B, said ring 60B cannot have transverse translations inside said seats and cannot have rotations, relative to the longitudinal axis of the chain, inside the seat. As a consequence, the ring 60B cannot have rotations relative to the longitudinal axis of the chain, in neither of the two spacer elements 30 into which it is inserted. Since the chain ring 60B is a substantially non-deformable rigid element, as a consequence the two adjacent spacer elements 30, inside which the same ring 60B is partially engaged, cannot rotate relative to one another around the longitudinal axis of the chain, i.e. around the axis X of FIG. 4. Still with reference to FIGS. 4 and 8, it is evident that an axial move away in the longitudinal direction X of two spacer elements 30 is not possible, because the ring 60B that is inserted into the two elements 30 is fastened to the two rings 60A enclosed by the spacer elements 30 and said rings 60B are in turn integral with the respective elements 30 for the reasons already explained. In the same way, an axial approach in the longitudinal direction X of two spacer elements 30 is not possible, because the ring 60B that is inserted into the two elements 30, once the minimum clearances present between ring and seats are recovered, would mechanically abut against the bottom of the seats 33, 39.

FIGS. 8 and 9 show how the particular shape of the seats 33, 34 and 39 maintains two adjacent rings 60A, 60B oriented to two planes that are substantially perpendicular to each other and allow only rotations of the support branch 4 around a unique rotation axis perpendicular to the longitudinal axis of the ring chain 6. Thus, all the spacer elements 30 of the branch can rotate relative to a same common rotation axis that will be perpendicular to the longitudinal axis of the ring chain.

Figure 9A:
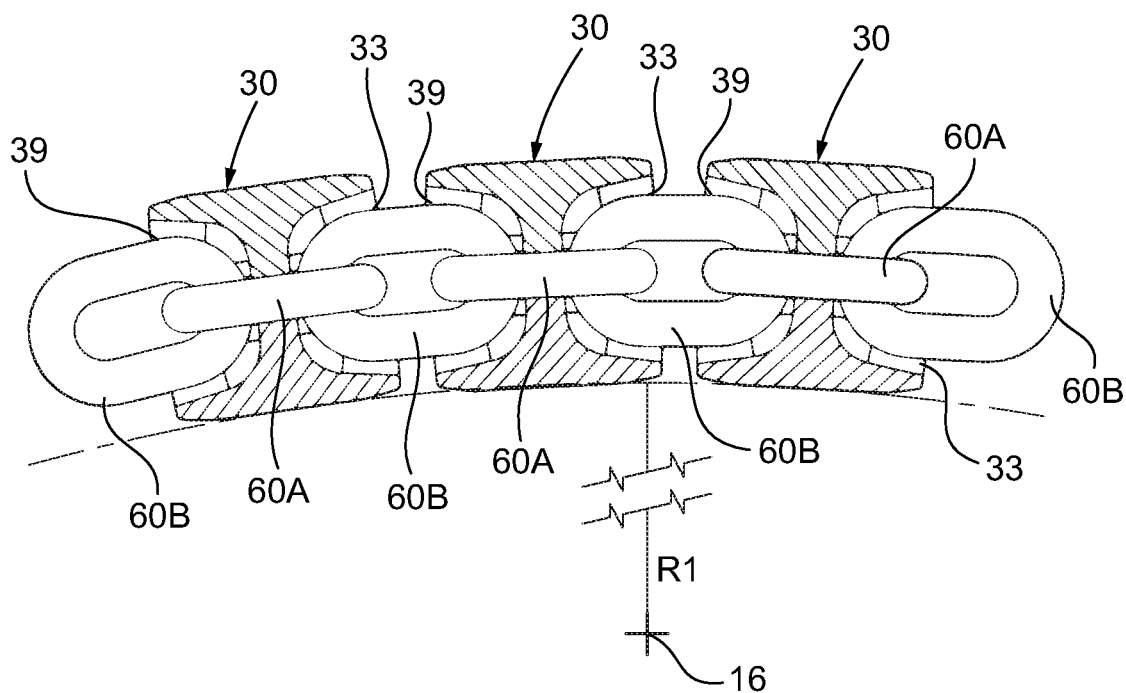
FIGS. 9A and 9B are schematic lateral views of two branch segments, wound with different radii of curvature, with the spacer elements sectioned on the perpendicular plane to the axis of winding.
Figure 9B:
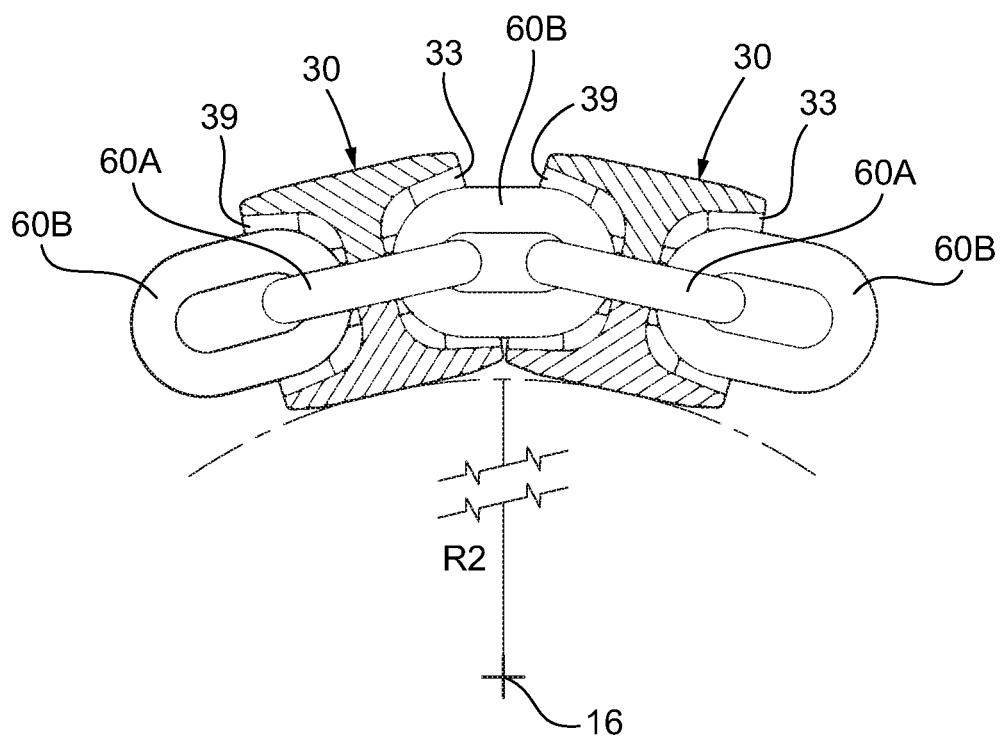

In particular, a support branch 4 can be wound with different radii of curvature on a drum of a winder 15, rotating around an axis 16. For the sake of simplicity, FIGS. 9A and 9B show a support branch 4 wound on two different drums 15 respectively with a first outer radius R1 and with a second outer radius R2, smaller than the first R1. It is emphasized that in these figures, due to reasons of space, the center of curvature of the drum 15, coinciding with the rotation axis 16, is not drawn in the real position. In addition, for the sake of greater clarity, in these figures only the spacer elements 30 are shown sectioned while the rings of the chain 6 are left in non-sectioned view.

The rings 60B of the second series of rings, thanks to the tapered shape of the second seats 33 and of the third seats 39 can carry out rotations inside the spacer elements 30, around an axis parallel to the axis 16, thus allowing a corresponding rotation of each spacer element 30 relative to the adjacent spacers. The spacer elements 30 can then arrange with their lower faces oriented normal to the surface of the drum, i.e. with each face arranged tangential to the circumference of the drum, allowing the branch 4 and the chain 6 to adapt to the curvature of the drum. To a smaller radius of curvature corresponds a greater mutual inclination of the adjacent spacer elements 30 and a greater rotation of the rings 60B inside the spacers 30. The rings 60A of the chain, being substantially integral with the spacer elements 30, in both cases always remain parallel to the upper and lower faces of the spacer elements 30. This is due to the fact that the rings 60A are substantially blocked in the first seats 34 (except for the mounting clearances).

Figure 10:
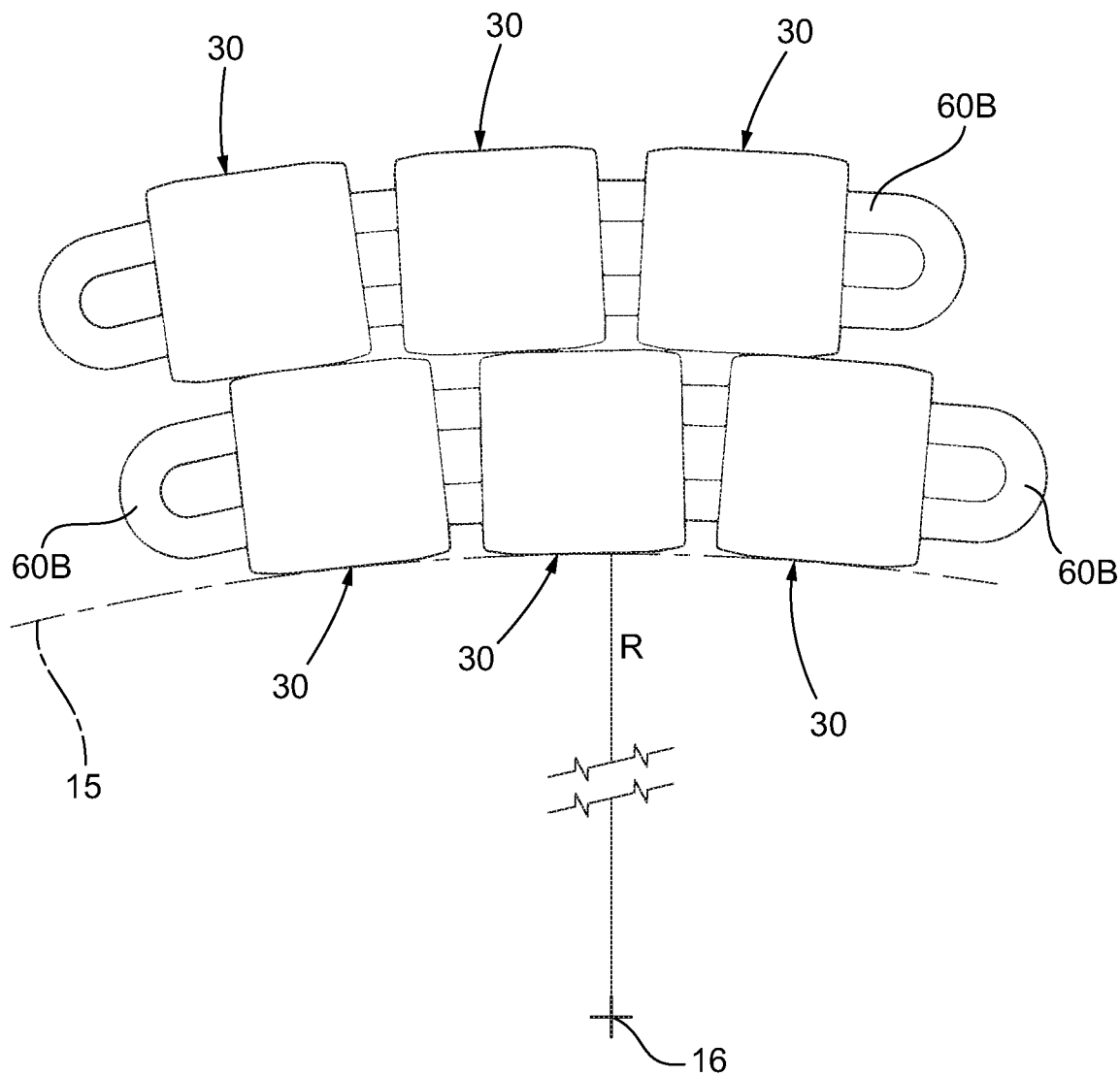
FIG. 10 illustrates, in a schematic lateral view, two support branches superposed on a winder.

The dimensions of the ring 60B in the direction of the thickness of the spacer element 30 are smaller than the thickness of the spacer element 30. In this way, when the spacer element 30 assumes a rotated configuration by effect of the winding on the drum 15, the bulk of the ring 60B remains limited by the contour of the spacer elements 30. In every configuration of the support branch 4, therefore, the ring 60B does not project beyond the bulk of the spacer elements 30. As can be observed in FIGS. 9A, 9B and 10, the surfaces of the spacer elements 30 meant to rest on the drum 15 or on already wound coils of the support branches 4 define a substantially continuous envelopment surface. FIG. 10 shows, in a side view, two segments of the support branch 4 wound on the winder 15 in two superposed layers or coils. Each spacer element 30 is positioned to rest on a spacer element belonging to the previously wound coil. The compression forces, caused by the outer layers of the support device wound subsequently on the drum 15, bear down on strong areas of the spacers 30, preventing such forces from acting directly on the pipes or on the cables of the feeder lines.

Figure 11A:
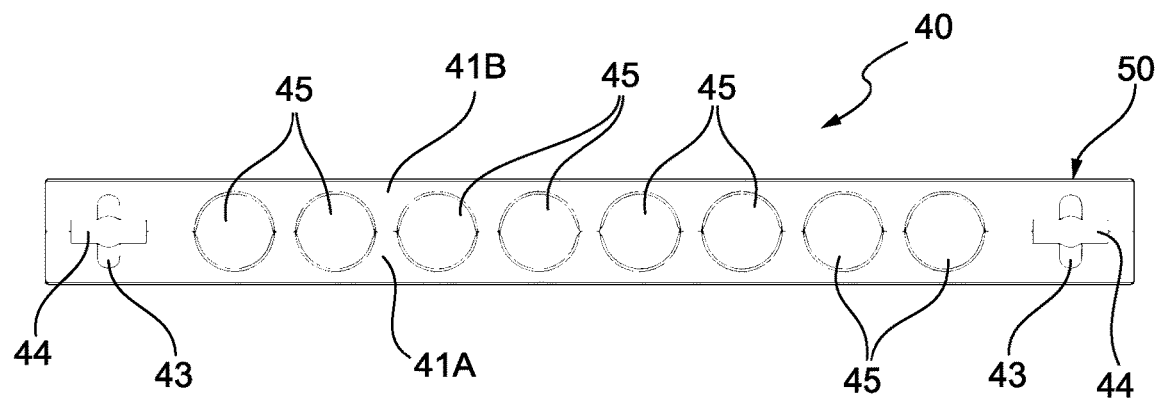
FIG. 11A is a frontal schematic view of a crossbar of the apparatus of FIG. 2 in assembled configuration.
Figure 11B:
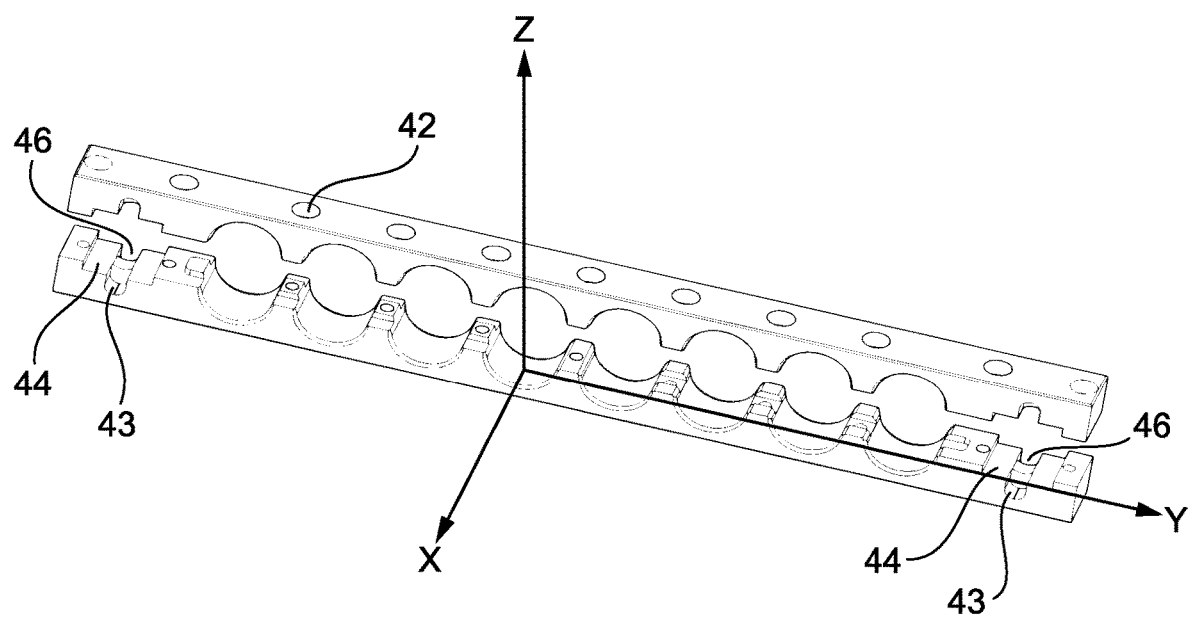
FIG. 11B is a prospective schematic view of a crossbar of the apparatus of FIG. 2 in non-assembled configuration.

As visible in FIGS. 11A and 11B, the crosspieces 40 are able to support the feed pipes 5 and are connected to the at least one branch 4 extending in a transverse direction namely in a direction perpendicular to the longitudinal axis of the branch. Each crosspiece 40 comprises at least one through guiding seat 45, preferably with cylindrical shape, adapted to guide the feed pipes 5. The through guiding seats 45 are preferably equidistant with one another in such a way as to create an orderly array of feed pipes, which are also substantially equidistant. More in general, the through guiding seats 45 can be positioned at any distance from each other.

Advantageously, the crosspieces 40, in a way that is wholly similar to the space elements 30 already described, can comprise a first half-crosspiece 41A and a second half-crosspiece 41B that can be coupled on each other by means of connecting screws in corresponding engagement seats 42.

The through guiding seats 45 are, preferably, made in the form of a clamp to be able to grip the feed pipes 5 and hence to make the pipes 5 integral with the crosspieces 40. For this reason, the crosspieces 40 are preferably made of aluminum or in material stronger than the spacer elements 30, to allow a greater tightening force of the two half-crosspieces that grip the feed pipes 5. Thanks to the greater stiffness of the crosspieces 40 it is possible to apply high tightening torques to the connecting means engaged in the engagement seats 42, without the creation of localized deformations on the crosspiece.

The thickness of the crosspiece, in the direction Z, is then determined mainly on the basis of the diameter of the pipes 5 and in general of the feeder lines to be guided and supported. The thickness of the spacer elements 30 is consequently made substantially equal to that of the crosspieces. Said thickness must be greater than the diameter of the pipes so that when the layers are wound on the drum, they rest on one another at the spacer elements 30 of the support branches 4, while the feed pipes 5 remain arranged in an intermediate position to the thickness of the spacer elements 30, so they are not crushed by the outer layers. At the same time, excessively high thicknesses of the spacer elements 30 and of the crosspieces 40 are avoided because by increasing the thickness of the layers, i.e. of the support branches 4, the dimensions required to the winder necessary to accumulate said layers are increased. A winder of excessive dimensions may not be installable or may limit the maneuverability of the machine on which it is mounted.

Each crosspiece 40 comprises at least one spacer portion 50 that has a first seat 44, a second seat 43 and a third seat 46 shaped respectively as the first seat 34, the second seat 33 and the third seat 39 of the spacer elements 30, which allow the coupling of each crosspiece with the rings 60A of the first series of rings.

Preferably, the first 44, the second 43 and the third 46 seats of the crosspieces are made at the end of said crosspieces 40 so that each of said crosspieces can be connected to two support branches 4, fastening to the chains that traverse each branch.

In this way the crosspieces 40 keep appropriately spaced and preferably parallel to the two lateral branches 4 of the support and guiding device 3, said crosspieces are then positioned perpendicularly to the longitudinal axis of the branches 4.

The openable half-shell structure allows mounting the crosspieces even when the chain has already been coupled to all the spacer elements 30.

Preferably, the crosspieces 40 are fastened to the ring chains 6 at regular intervals, i.e. with a predetermined number of rings 60A, 60B between one crosspiece and the other. In the embodiment in which each crosspiece 40 is connected to two or more support branches 4, said crosspiece 40 is prevented from rotating around the longitudinal axis of the branch because it has at least the two terminal ends fastened. Considering a segment of a support branch 4 comprised between two consecutive crosspieces, it can be intuited that the two spacer elements 30 closest to the crosspiece could only undergo very small rotations around the longitudinal axis of the chain, allowed by the clearances present between the seats 33 and 39 and the rings 60B.

Continuing towards the center of this segment of branch, each spacer element 30 could undergo very small rotations with respect to the preceding spacer element, still because of the clearances. If all small rotations were in a concurring direction, they would be summed so that the spacer element located at the center of the branch segment between two crosspieces will be the one that can undergo the maximum rotations. For equal clearances in the seats, the maximum amplitude of the rotation of a spacer element 30 depends on the number of spacer elements 30 present between two consecutive crosspieces. It is thus very simple to adjust this maximum value of rotation by adjusting the distance between two consecutive crosspieces 40. This maximum value of rotation of a single spacer element 30 is thus entirely independent of the total length of the support branch 4 which can even be hundreds of meters. Advantageously, the crosspieces 40 are installed along the support branch 4 at a distance of no more than 4-5 meters from each other and this ensures that the possible rotations of the spacer elements 30 around the axis of the chains 6 have nearly null or substantially negligible amplitudes.

In the particular embodiment in which the support and guiding apparatus 3 comprises a unique support branch 4 the first 43, the second 44 and the third 46 seats of the crosspieces 40 are advantageously provided in an intermediate position, preferably median relative to the two ends.

Figure 12:
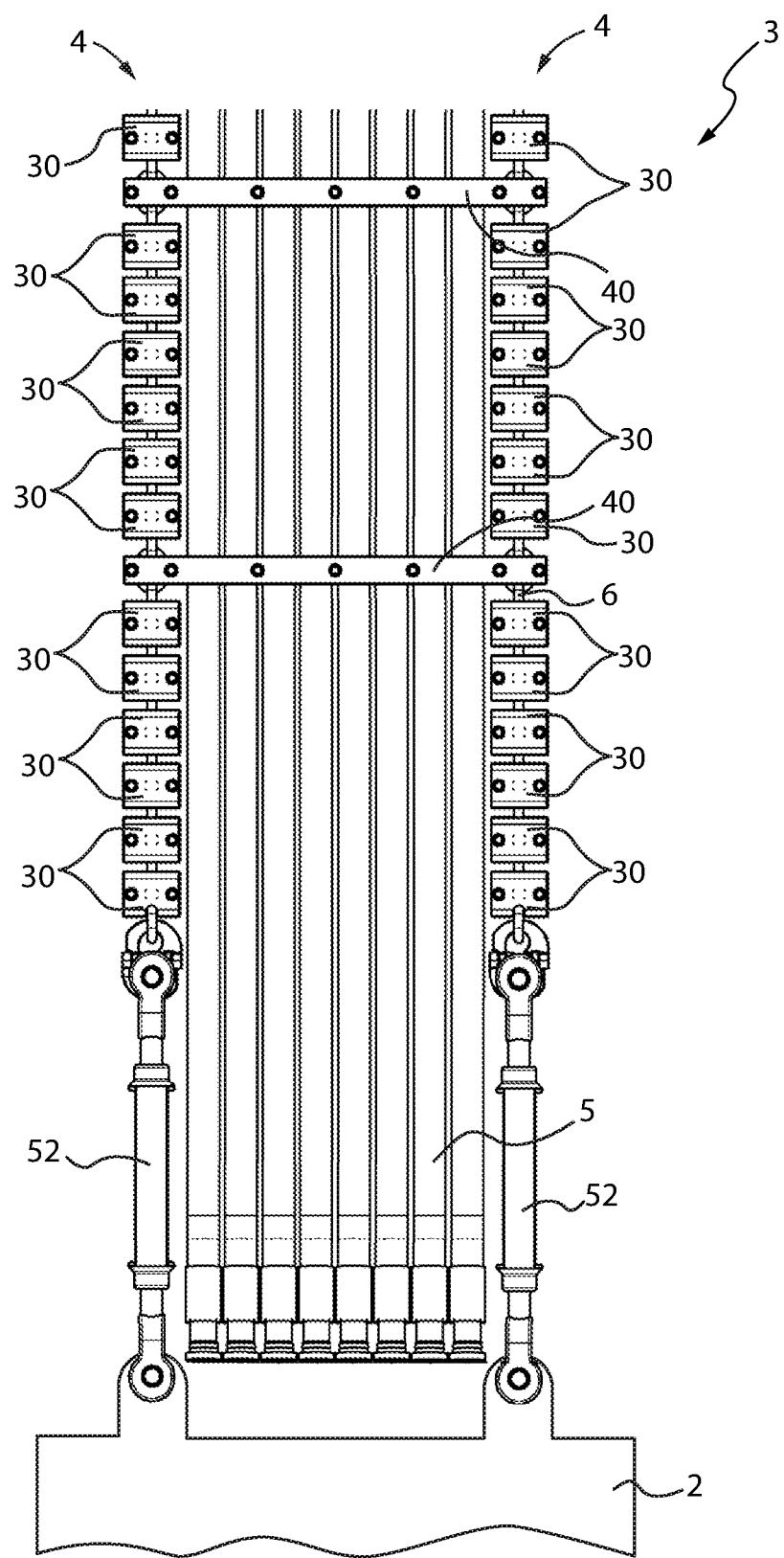
FIG. 12 is a partial frontal schematic view of an embodiment variant of the support and guiding apparatus for feeder lines.

With reference to FIG. 12, an embodiment variant of the present invention is shown, which is advantageous if the support and guiding apparatus 3 for feeder lines comprises at least two support branches 4, each of which is associated with a ring chain 6. For the sake of simplicity, reference shall be made, in particular, to the case in which there are two support branches 5 mounted to the two lateral ends of the feeder line i.e. with all feed pipes 5 positioned between the two support branches 4.

Each of the support branches 4 comprises a tensioner element 52 which at one own end is connected to the corresponding ring chain 6 and at the other end is adapted to be connected to the excavation device 2. The tensioner element 52 can be adjusted to vary its own length and it is preferably a screw tensioner comprising a central adjustment body provided with nut screw which can be acted upon to adjust the total length of the tensioner. By adjusting the tensioner element 52 it is therefore possible to make small adjustments of the length of the support branch 4, e.g. substantially equal at least to the length of a chain ring but preferably equal to the length of a few rings. Since both support branches 4 are connected to the excavation device 2, it is important that they have the same length in order to distribute equally on the two branches the loads due to the weights of the support and guiding apparatus 3.

Because of the construction tolerances of the rings of the chains 6, although the two support branches 4 consist of the same number of chain rings, it is possible that the two chain segments 6 that make up the two branches 4 have slightly different lengths. In this case, it is possible that one of the two support branches 4 is more heavily loaded than the other, or it is possible that one of the two support branches 4 is loosened or anyway not tensioned and hence does not contribute to bear the weights, while the other one is excessively tensioned and overloaded.

In the same way, because of the wear of the rings due to the friction during utilisation in construction sites, the thicknesses of the rings in the areas of mutual contact tend to be reduced, thus increasing the internal dimension of each ring and hence increasing the length of the chains 6. This can entail a loosening of both branches or of a single support branch 4. If both support branches 4 were loosened, the crosspieces 40 would also move away from each other and this could generate undesired tensions on the feed pipes 5 coupled to the crosspieces 40 in the segment between the crosspieces themselves. Adjusting the length of the tensioner element 52 it is possible to return each support branch 4 to the correct length so that both branches 4 are tensioned and equally loaded. An advantageous process for the correct adjustment of the support branches 4 with the tensioner elements 52 and for the uniform distribution of the loads along the entire guiding apparatus 3 provides the following steps:

disconnecting the end of the support and guiding apparatus 3 which is fastened to the excavation device 2;

fully unwinding the support and guiding apparatus 3 of the winder 15 and connecting the free end of the respective tensioner elements 52 to a weight or to a fixed restraint;

loosening the screws of all crosspieces 40 so that they do not constrict the feed pipes 5 but allow the pipes to slide relative to the crosspieces 40 themselves;

rotating the winder 15 in such a way as to tension the support branches 4;

verifying whether both support branches 4 are appropriately tensioned, and if they are not, acting on the adjustment of the length of the tensioners 52 until the two branches are equally tensioned;

tightening the screws of the crosspieces 40 again so that they grip the feed pipes 5 again;

connecting the end of the guiding apparatus 3 to the excavation device 2 again.

This process is carried out at the time of installation of the support and guiding apparatus 3 and it can be repeated periodically during the steps of conducting periodic maintenance on the drilling machine.

The above description clearly illustrates the characteristics of the support and guiding apparatus for feeder lines object of the present invention, as well as the relative advantages are also clear.

In particular, the spacer elements allow the use of ring chain within the support branches and prevent rotations of the branches around the longitudinal axis of the chain, allowing a correct winding of the feeder lines on the collection drum.

Use of ring chains prevents elongations of the support branches when they are subjected to traction loads during the working conditions. In addition the ring chains, because of their shape, do not lose their flexibility even in case of oxidation and hence they are advantageous for use in immersion in the stabilising fluids of the excavations.

Ring chains are less expensive than steel cables of equal load-bearing capacity, hence their use makes the support and guiding apparatus more economical. In addition, chains are less sensitive than cables and require less maintenance and less frequent inspections. In fact since cables are made of strands, they can easily be damaged if they come into contact with particularly hard and sharp debris in the excavation leading to a fraying of the outer strands. In addition, in case of cables that traverse spacer elements, it is particularly difficult to see any superficial fraying because it is hidden by the contours of the spacers themselves.

The presence of interspaces between a spacer element and the other, and the clearances present between the rings of the chain and the seats of the spacer elements and of the crosspieces, with the consequent possibility for small relative movements, prevents the accumulation of slurries and debris in the interstices. The relative rotation movements between the chain rings and the spacer elements 30, allowed by the tapered shape of the second 33 and of the third 39 seats allows a "self-cleaning" effect of the succession of the spacer elements, preventing seizing, and it ensure that the flexibility of the branch is maintained.

Every spacer element is axially fastened to a chain ring. If an element breaks, all remaining elements of the branch maintain their pre-determined position, without sliding longitudinally along the branch. Moreover, the absence of longitudinal sliding of the spacer elements relative to the chain prevents the profile of the rings from acting with a "sawtooth" effect, consuming the housing seats of the chain inside the spacer elements themselves.

If a chain breaks, it can be repaired by replacing the broken ring with a "false link" ring of the known type commonly available on the market. Said false link rings are elements that can be opened during installation to be able to engage in two adjacent rings, which can then be closed once they are engaged to maintain the connection, assuring the same load-bearing capacity of the other rings of the chain. Hence, repairs are easy and economically because only one ring or section of chain with damaged rings is discarded, which anyway will have a negligible length with respect to the total length of the support branch 4 which can be hundreds of meters. In the solutions of the prior art, in which cables are used that traverse all the spacers of a branch, if the cable is damaged in one point, the entire cable will have to be replaced, and it may hundreds of meters long and hence a very high cost.

Construction in two half-shells of the spacer elements makes them separable and makes it easy to replace an intermediate spacer element of the branch, without all the other spacer elements moving by sliding.

The spacer elements rest with their flat faces on the drum of the winder and therefore these faces are maintained parallel to the axis of the winder. Consequently, these spacer elements of the wound segment that are maintained oriented, also maintain oriented the spacers of the segment exiting the winder and moving towards the transmission pulley. In the same way, the spacer elements that rest their flat faces on the transmission pulley maintain the correct orientation of the spacer elements present in the suspended segment that goes from the pulley to the excavation module. In this way, during the ascent or descent movements of the module, the spacer elements arrive on the pulley always oriented correctly, approaching it in tangential direction to be able to slide thereon, avoiding impacts and entanglements, and in the same way, when winding, the spacer elements arrive on the drum always oriented correctly to be able to be deposited on the layers or branch coils previously accumulated in the drum.

The support and guiding apparatus for feeder lines, according to the present invention, is thus able to perform both the support function for the weight of the feeder lines, and the function of keeping the spacer elements aligned to allow a correct winding of the feeder lines on the drum.

The particular shape of the seats of the spacer elements, in addition, assures the winding of the support branch around a single winding axis and at the same time it prevents both the mutual rotation between consecutive spacer elements and the rotation of the support branches. Said shape of the seats also allows inserting into the spacer elements chains having large dimensions, if compared to the outer dimensions of the spacer element, without weakening the structure of the spacer element itself. If, in a spacer element of equal dimensions, a cylindrical hole were made of such diameter as to let the rings of the chain 6 pass through, said spacer would be particularly weakened at the hole and would flex when subjected to external pressures.

Lastly, it is clear that the support and guiding apparatus for feeder lines thus conceived can be subject to numerous modifications and variations, without departing from the scope of the invention; moreover, all details can be replaced by technically equivalent elements. In practice, the materials used, as well as the dimensions, may be any according to the technical needs.

The invention claimed is:

1. Support and guiding apparatus for feeder lines comprising a feed pipe for an excavation device, said support and guiding apparatus comprising a support branch and a plurality of transverse connection elements or crosspieces adapted for guiding said feed pipe and connected to said support branch, where said support branch comprises:
   a ring chain comprising a first series of rings and a second series of rings linked to one another in an alternate manner, defining a longitudinal axis (X) when said ring chain is placed in a deployed configuration;
   a plurality of spacer elements, each of said spacer elements being coupled to a respective ring of said first series of rings so that said each of said spacer elements cannot slide with respect to said respective ring of said first series of rings, said each of said spacer elements having a first seat that houses said respective ring of said first series of rings by orienting said respective ring of said first series of rings in a substantially stable manner on a first lying plane, said each of said spacer elements having a second seat and a third seat opposite each other that partially house respective rings of said second series of rings linked to said respective ring of said first series of rings housed in said first seat by orienting said respective rings of said second series of rings on a second lying plane transverse to said first lying plane, said each of said spacer elements being arranged to prevent a longitudinal sliding between said respective ring of said first series of rings and said respective rings of said second series of rings, and to allow a rotation of said respective rings of said second series of rings only on said second lying plane around a rotation axis, said rotation axis being perpendicular to the longitudinal axis of said ring chain and perpendicular to said second lying plane.

2. Support and guiding apparatus for feeder lines according to claim 1 wherein said first seat of said each of said spacer elements is made as a through-cavity that extends in a longitudinal direction between two opposed faces of said each of said spacer elements and that defines on said two opposed faces two openings having an elongated shape in a direction parallel to said first lying plane.

3. Support and guiding apparatus for feeder lines according to claim 1 wherein said second seat and said third seat of said each of said spacer elements are each arranged and/or shaped to prevent a longitudinal sliding between said respective ring of said first series of rings and said respective rings of said second series of rings, and to allow a rotation of said respective rings of said second series of rings only on said second lying plane around said rotation axis.

4. Support and guiding apparatus for feeder lines according to claim 3 wherein said second seat and said third seat of said each of said spacer elements extend in a longitudinal direction starting from opposite faces towards an inside of said each of said spacer elements by a predetermined tract defining a separating intermediate tract therebetween.

5. Support and guiding apparatus for feeder lines according to claim 3 wherein said second seat and said third seat of said each of said spacer elements respectively face two opposed faces of said each of said spacer elements and define two respective openings on said two opposed faces, said second seat and said third seat each having a tapered shape in a longitudinal direction starting from an inside towards said respective openings, with a maximum width at said respective openings.

6. Support and guiding apparatus for feeder lines according to claim 3 wherein each of said second seat and said third seat of said each of said spacer elements has a back wall with a curvilinear profile that is complementary to a curvilinear end of each of said respective rings of said second series of rings.

7. Support and guiding apparatus for feeder lines according to claim 4 wherein said first seat of each of said spacer elements has internally an abutment protrusion, that extends on said separating intermediate tract transverse to said first lying plane, thus defining lateral channels for housing said respective ring of said first series of rings, said abutment protrusion being shaped to limit a mobility of said respective ring of said first series of rings relative to said each of said spacer elements.

8. Support and guiding apparatus for feeder lines according to claim 1 wherein said each of said spacer elements comprises two half-shells including a first half-shell and a second half-shell placed on and constrained to the first half-shell, said half-shells comprising two respective first, second and third half-seats adapted to make said first, said second and said third seat, respectively, when said two half-shells are constrained to each other.

9. Support and guiding apparatus for feeder lines according to claim 8 wherein said half-shells comprise two half-protrusions adapted to make said abutment protrusion when said two half-shells are constrained to each other.

10. Support and guiding apparatus for feeder lines according to claim 1 wherein each of said crosspieces comprises a spacer portion having a first, a second and a third seat that are shaped as said first, said second and said third seats of said spacer elements respectively, so that said crosspiece is coupled with said rings of said first series of rings.

11. Support and guiding apparatus for feeder lines according to claim 1 wherein the faces of said spacer elements parallel to said first lying plane together define a substantially continuous envelopment surface.

12. Support and guiding apparatus for feeder lines according to claim 1 comprising at least two of said support branches, where each of said support branches comprises a tensioner element adjustable in length, the tensioner element having a first end connected to a corresponding ring chain and a second end arranged to be connected with said excavation device.

* * * * *